Figure 1:
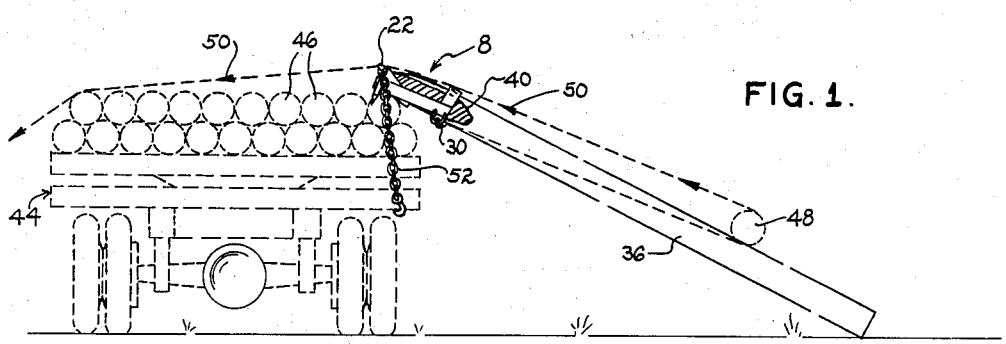

April 24, 1956 R. H. DOBBS 2,742,995
SUPPORT FOR VEHICLE LOADING SKIDS
Filed June 20, 1955

RICHARD H. DOBBS
INVENTOR.

BY *Hubert Miller*
ATTORNEY

United States Patent Office 2,742,995
Patented Apr. 24, 1956

2,742,995

SUPPORT FOR VEHICLE LOADING SKIDS

Richard H. Dobbs, Winfield, Kans.

Application June 20, 1955, Serial No. 516,663

8 Claims. (Cl. 193—41)

This invention relates to loading skids and pertains more particularly to a supporting device therefor which permits the temporary resting of one end of the skid on a platform or vehicle so that relatively heavy objects, such as logs, may be moved thereover from one elevation to another.

Certain problems involved in the design and construction of skid holders have been dealt with in my two earlier patents, namely Patent No. 2,559,712, issued July 10, 1951, and Patent No. 2,673,635, issued March 30, 1954. While these structures have performed notably well, having accomplished their respective aims in an effective manner, nonetheless the above alluded to holders have been somewhat expensive to manufacture. Accordingly, one important object of the present invention is to simplify the construction of a skid holder to such an extent that it will be susceptible to exceptionally economical fabrication.

Another object of the invention is the provision of a skid holder of such construction that it lends itself readily to utilization with skids of a wooden log or pole variety, thereby effecting a further saving because of the use of low cost wood for the skid itself.

A further object of the invention is to provide a skid holder that may be rested either directly upon the load supporting structure, as would be the situation when first beginning to load cargo, or upon the cargo itself as it is in the process of being stacked. In this connection, it is an aim of the invention to provide reliable anchorage of the skid's upper end at the different elevations mentioned immediately above, and it is also a desideratum to achieve the anchorage, which has already been mentioned, without the need of elaborate fastening means, in many instances with no accessory mechanism whatsoever, thus obviating the need for mounting coacting fittings on the vehicle or loading platform. Hence, it will be appreciated that my skid holder is exceedingly versatile in fulfilling the basic requirements expected from it.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 2:
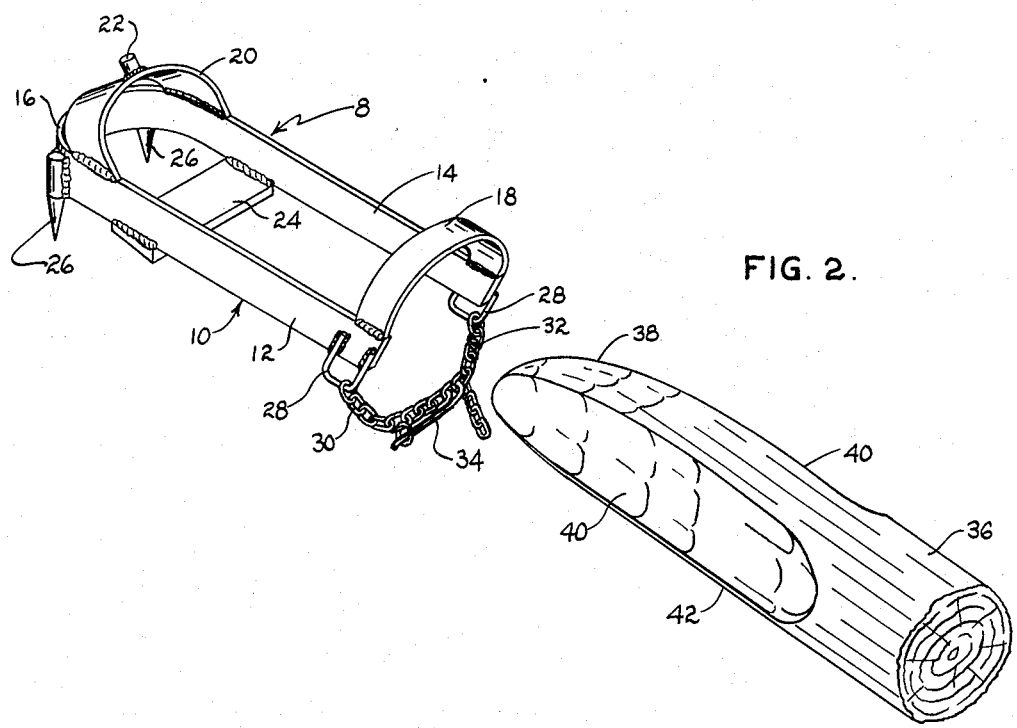

In the drawing:

Figure 1 is a side elevational view of a skid equipped with my skid holder, the cargo and truck upon which the cargo is being loaded having been depicted in phantom outline for the purpose of better contrast, and Figure 2 is a perspective view illustrating my skid holder just prior to the insertion of a skid end thereinto.

Referring now in detail to the drawing, the skid holder exemplifying my invention has been designated in its entirety by the reference numeral 8 and comprises a first metallic strip 10 bent into the form of a U, thus providing a pair of parallel legs 12, 14 and a curved bight 16. To the free ends of the legs is fixedly welded in an upstanding, perpendicular manner a U-shaped strip 18, whereas at the other end of the legs, that is, adjacent the bight, still another U-shaped strip 20 is employed which is also fixedly welded in place but at a forwardly directed angle for a purpose presently to be explained. The U-shaped member 20 has a chain engaging lug 22 welded to its bight, and the part this lug is intended to play will also be made manifest hereinafter.

On the underside of the U-shaped member 10 and intermediate the U-shaped members 18 and 20 is welded a bridging or straight cross strip 24. Forward of this bridging strip 24 and slightly in advance of the U-shaped member 20, i. e. where the legs 12 and 14 merge into the bight 16, is fixedly secured, also by welding, a pair of downwardly directed prongs or sharpened pins 26, one on either side. Through the agency of these prongs the skid holder may be rested on a relatively flat surface or when placed atop cargo it will serve to engage in crevices or regions of depression, or if the cargo be logs the prongs will penetrate and anchor to a log.

On the underside of the legs 12 and 14 and at their free ends is a welded pair of heavy wire staples 28, of adequate size to anchor two sections of flexible chain 30, 32. The chain sections 30, 32 may be adjustably connected together, as by a slip hook 34.

Up to this point no specific description has been presented concerning the construction of the skid itself, other than to say that additional savings may be experienced through the use of wood in the form of a log or pole. Accordingly the wooden skid, generally cylindrical, has been given the reference numeral 36. It is to be noted that the upper end, that is the end to be accommodated by the holder 8, has been somewhat rounded at 38 and the sides 40 adjacent thereto flattened. By so doing the rounded end 38 forms a nose that is readily received into the holder 8, bearing firmly against both the bight 16 and the U-shaped member 20, whereas the flat sides confront the legs 12, 14 of the U-shaped member 10. The underside, labeled 42, of the skid 36 is designed to bear against the cross piece 24, whereas the U-shaped member 18 partially encircles another portion of the skid. Additionally, the proper adjustment of the chain sections 30, 32 against that area of the skid's underside 42 lying subjacent the U-shaped member 18 assures a solid mounting of the holder 8 on the skid 36 with a well distributed force throughout the holder from the introduction of extra heavy loads onto the skid.

Showing one use to which the holder 8 and skid 36 may be put is Fig. 1 where a truck 44 has been pictured in phantom outline. In this particular situation the truck 44 has been partially loaded with logs 46, there being suitable chocks or other means (not shown) employed for retaining the logs in their stacked formation. Another log 48 is in the process of being loaded onto the truck, and the directional arrows 50 associated therewith indicate the path taken by the transfer cable being used to pull the log 48 up the incline provided by the spaced parallel skids 36.

It can be observed that the prongs 26 in this instance project downwardly into a crevice formed by two side-by-side logs that have ben loaded. In many instances such anchorage will suffice, but further insurance against slippage is incorporated into the holder design by virtue of the lug 22 on the U-shaped member 20, this lug projecting through one link of a chain 52 having its ends hooked to the truck chassis. In this way the holders 8 are prevented from slipping in any possible direction, including that along the longitudinal axis of the truck as well as transversely thereto.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. A skid holder comprising: a first U-shaped member including a pair of substantially parallel legs; a second U-shaped member having its legs fixedly attached adjacent the free ends of the first legs and arranged substantially perpendicular therewith; a third U-shaped member having its legs fixedly attached to said first legs adjacent their bight ends and arranged at an obtuse angle with respect to the longitudinal axis of said first legs; and a bridging member fixed to the sides of said first legs opposite the second and third U-shaped members at a locus intermediate said second and third members.

2. A skid holder comprising: a reversely bent strip forming a first U-shaped member open at one end and closed at its other end; a second U-shaped strip member having its free ends welded to the free ends of this first U-shaped member and extending upwardly at a right angle with respect to said first U-shaped member; a third U-shaped strip having its free ends welded to the first U-shaped member adjacent the bight thereof and inclined upwardly and toward said other end; a pair of downwardly directed spaced prong elements welded to said first U-shaped member subjacent said third U-shaped member; and a relatively straight bridging strip welded to the lower side of said first U-shaped member intermediate its open end and said prong elements.

3. The skid holder described in claim 2 including chain means having connection with the free ends of the first U-shaped member.

4. A skid holder comprising: a pair of substantially parallel leg elements; a relatively straight strip bridging the underside of said leg elements at a locus intermediate their ends; an arcuate strip bridging the upperside of said leg elements adjacent one end thereof; and a pair of arcuate strips bridging the other end of said leg elements, said pair of arcuate elements being arranged at an acute angle with respect to each other.

5. The skid holder described in claim 4 in which one of said pair of arcuate strips is the axial continuation of said leg elements and the other is disposed at an angle inclining upwardly with respect thereto.

6. A skid structure comprising: an elongated wooden skid of generally cylindrical cross-section having a rounded end and relatively flat sides adjacent said rounded end; and a holder receiving said rounded end including a first U-shaped member provided with substantially parallel legs confronting said flat sides, a second U-shaped member fixed perpendicularly to said legs at their free ends and embracing a portion of said skid, a third U-shaped member affixed to said first U-shaped member near the connected ends of said legs, said third U-shaped member being disposed at an angle relative to the general plane of the third member so as to embrace an upper portion of said rounded skid end, and a relatively straight bridging member having its ends affixed to the underside of said legs and extending beneath a portion of said rounded skid end.

7. The skid structure described in claim 6 in which the free ends of said legs have adjustable chain means secured thereto, said chain means extending beneath the portion of said skid embraced by said second U-shaped member.

8. The skid structure described in claim 6 in which the first U-shaped member is equipped with a pair of downwardly directed prong elements subjacent said third U-shaped member.

No references cited.